United States Patent [19]
Numata

[11] 3,801,822
[45] Apr. 2, 1974

[54] EXPOSURE CONTROL DEVICE
[75] Inventor: Saburo Numata, Urawa, Japan
[73] Assignee: Fuji Shashin Koki Kabushiki Kaisha, Saitama-ken, Japan
[22] Filed: Sept. 13, 1972
[21] Appl. No.: 288,884

[30] Foreign Application Priority Data
Sept. 14, 1971 Japan.............................. 46-71510

[52] U.S. Cl........................... 250/214 P, 95/10 CD
[51] Int. Cl............................................ H01j 39/12
[58] Field of Search ............ 250/214 R, 214 P, 229; 95/10 R, 10 A, 10 B, 10 CE, 10 D, 64 C, 64 D; 178/5.4 E, 17 D, DIG. 29

[56] References Cited
UNITED STATES PATENTS
3,511,145 5/1970 Ort................................... 95/10 CD
3,651,749 3/1972 De Groot......................... 95/10 CD

*Primary Examiner*—Archie R. Borchelt
*Assistant Examiner*—D. C. Nelms
*Attorney, Agent, or Firm*—Fleit, Gipple & Jacobson

[57] ABSTRACT

In addition to a diaphragm, a filter turret is used to control the amount of light passing through a taking lens of a television camera or the like, whereby the range of exposure control is enlarged. When the diaphragm which is automatically controlled comes to its limit, a filter is changed to another filter having different transmittivity.

7 Claims, 4 Drawing Figures

EXPOSURE CONTROL DEVICE

BACKGROUND OF THE INVENTION

1. Field of the Invention

This invention relates to an automatic exposure control device, and more particularly to a device for controlling exposure or light value over a wide range in a camera.

2. Description of the Prior Art

In the field of television and cinematograph, the brightness of an object varies over a great range during its operation. It is strongly desired in the camera used in these fields to control the exposure or light value over the wide range of the brightness variation. It has been very difficult or impossible, however, to control the exposure over such a wide range due to the mechanical restriction in designing the television camera, especially in designing the diaphragm for the taking lens.

SUMMARY OF THE INVENTION

The primary object of the present invention is to provide a device for automatically controlling the exposure over a wide range in a camera such as a cinematographic camera, a television camera or the like.

In order to accomplish the above object, the device in accordance with the present invention utilizes several interchangeable neutral filters of different density which are automatically put into the optical axis of the taking lens by means of an electric circuit detecting the brightness of the object so that the light value of the light passing through the taking lens can be varied over a wide range.

In this invention, for instance, a filter is changed to a denser filter which allows less amount of light pass therethrough when the diaphragm automatically controlled by means of a known exposure control means reaches the minimum limit thereof. Then, at the time when the filter is changed to a denser one, the size of the diaphragm becomes larger again and starts to be made smaller as the brightness or exposure value increases.

DESCRIPTION OF PREFERRED EMBODIMENT

Figure 1:
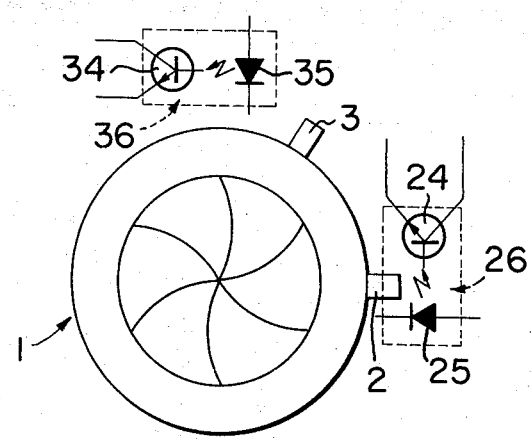
FIG. 1 is a front view of a diaphragm employed in a camera in which the control device in accordance with the present invention is provided.
Figure 2:
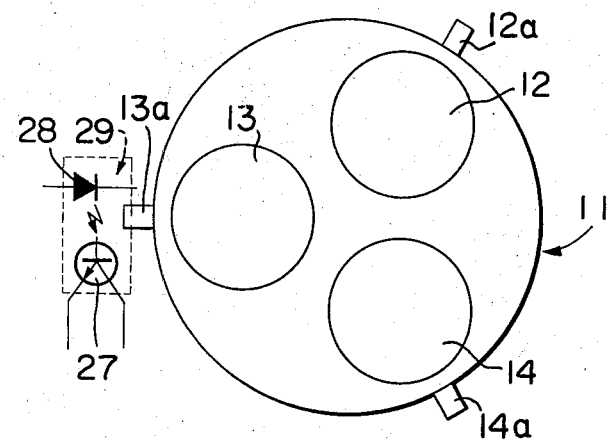
FIG. 2 is a front view of a filter turret shown in relation with a control photocoupler employed in accordance with the present invention.
Figure 3:
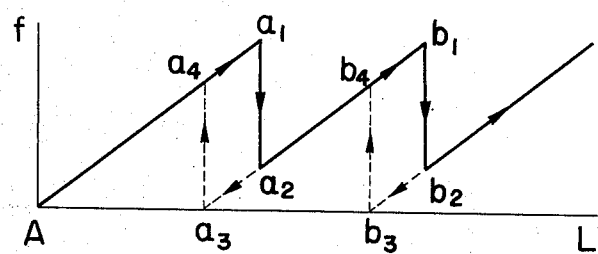
FIG. 3 is a graphical representation showing the relationship between light value and the exposure control means.

Referring to FIGS. 1 to 3 showing the basic principle of the present invention, an automatic control diaphragm 1 which is automatically controlled in association with any type of known exposure controlling means operated in accordance with the brightness of the object is provided with two projections 2 and 3 on the periphery thereof. The projections 2 and 3 are fixed to a diaphragm control ring and indicated the size of the diaphragm by the position thereof. The automatic control diaphragm 1 is used as a "first exposure control means," and is used in cooperation with a "second exposure control means." The second exposure control means is a filter turret 11 shown in FIG. 2 which has several neutral density filters 12, 13 and 14 of different density and is controlled by a switching means operated by said first exposure control means. The switch means comprises said projections 2 and 3 indicating the size of the diaphragm and electrical switching means provided under effect of said projections.

As shown in FIG. 1, two photocouplers 26 and 36 are provided at the limit positions of the projections 2 and 3, respectively, so that the limit of the diaphragm size may be electrically detected. The photocouplers 26 and 36 include luminous (light emitting) diodes 25, 35 and phototransistors 24, 34 to receive the light from the luminous diodes 25, 35, respectively. The projections 2 and 3 have an effect of intercepting the light from the luminous diodes 25, 35 and prevent the light from reaching the phototransistors 24, 34. Thus, the limits of the diaphragm size is detected electrically by the photocouplers 26, 36.

The first exposure control means is operated in a known manner by an image signal of the television, and the limit positions thereof are detected and the signal thereof is transmitted to said second exposure control means by means of a switching means comprising said photocouplers 26, 36 and Schmit circuits. In more detail, the switching means provides an output to a driving motor control circuit of the second exposure control means.

When the diaphragm 1 comes to its limit, for instance its smaller limit, one of the projections 2 comes to the photocoupler 26 and operates the switching means to rotate the filter turret 11 and change an N.D. filter 12 to a denser N.D. filter 13. When the diaphragm 1 comes to its smaller limit with the denser filter 13, the switching means again operates to rotate the filter turret 11 to further change the filter 13 to a still denser filter 14.

The relation between the diaphragm 1 rotation and the exposure or light value is shown in FIG. 3. The diaphragm is made smaller along the line A–$a$, first, and when the diaphragm comes to its smaller limit the denser filter 13 is put into the optical path instead of the filter 12. Thus, the incident light value is abruptly lowered. In response to this decrease in the light value, the diaphragm 1 is abruptly opened along the line $a_1 - a_2$. Then, the diaphragm 1 is gradually closed again along the line $a_2 - b_1$ in the similar manner to the first operation mentioned above.

When the value of light decreases, the operation of the device is just reverse of the above described operation. That is to say, the projection 3 makes the photocoupler 36 operate to switch the filter turret driving means in the reverse manner of the above described manner. When the diaphragm 1 comes to its larger limit, the projection 3 intercepts the light from the luminous diode 35 and operates the switching means to rotate the filter turret 11 in the counterclockwise direction and changes the denser filter 13 to a filter 12 having lower density.

Figure 4:
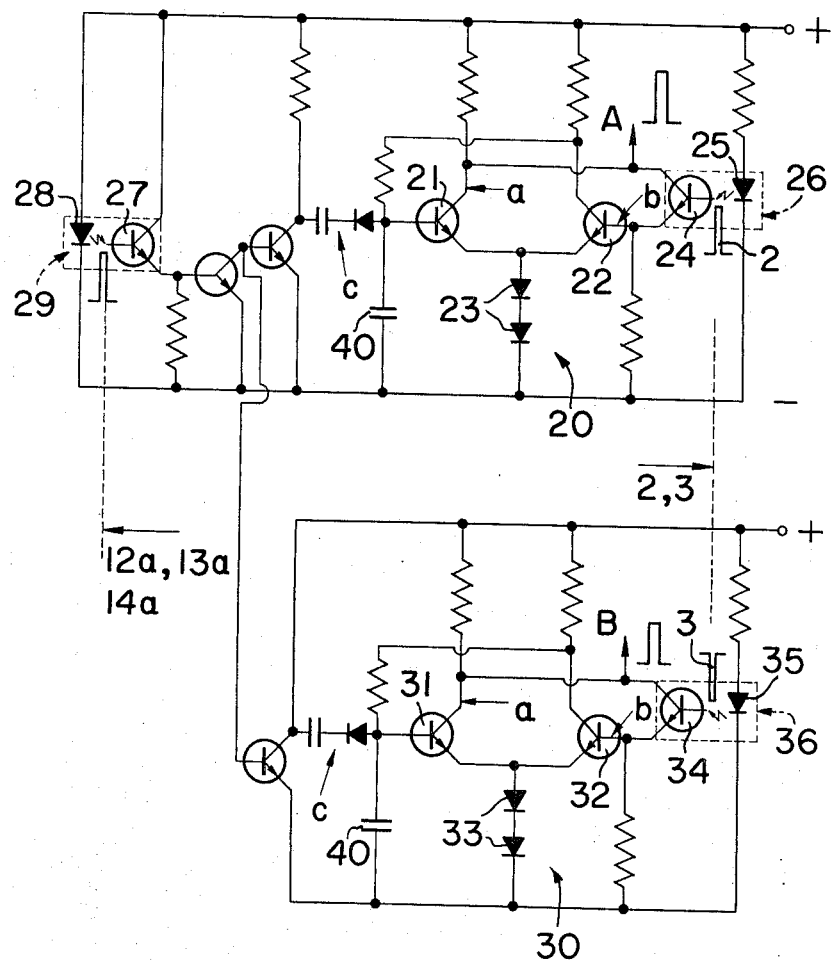
FIG. 4 is a view of an electric circuit which operates to control the filter turret to change the filters of different density.

Referring to FIG. 4, the electric circuit serving as said switching means comprises a Schmit circuit including a first control circuit 20 having transistors 21, 22 and a set of diodes 23. When the first exposure control means or said diaphragm comes to its smaller limit, said projection 2 intercepts the light from the luminous diode 25 and the transistor 24 and accordingly the transistor 22 are cut off from the normal condition. Then, the transistor 21 is turned on and an output of a definite level is obtained from a terminal A. The output from the terminal A serves as an input sent into a control circuit for operating said second exposure control means. Thus, the filter turret 11 is rotated clockwise and the denser filter 13 is brought into the optical axis of the camera.

The filter turret 11 is provided with projections 12a, 13a and 14a on the periphery thereof at positions corresponding to said filters 12, 13 and 14 to intercept light emitted by a luminous diode 28 in a photocoupler 29 and cut off the phototransistor 27 therein. Therefore, when the denser filter 13 is brought into the optical axis of the camera, the projection 13a effects to cut off the photocoupler 29 and accordingly the Schmit circuit is reversed and the output from said control circuit 20 is cut off. Accordingly, the operation of said second exposure control means or said filter turret 11 is stopped and the first exposure control means or said diaphragm is operated according to the image signal through the denser filter 13.

To the contrary, when the amount of light is decreased and the diaphragm 1 comes to its larger limit, the projection 3 cuts off the light in the photocoupler 36 and an output of a definite level is obtained from a terminal B. By this output B, the second exposure control means 11 is rotated counterclockwise until the filter 12 of lower density is brought into the optical path. When the filter 12 is put into the optical path, the projection 12a corresponding to the filter 12 comes to cut off the photocoupler 29, which results in reverse of a second control circuit 30 similar to the first control circuit 20.

As shown in and apparent from FIG. 4, phototransistors (or transistors) 24 and 34 are inserted in series between collectors (a) of the transistors 21 and 31 and bases (b) of the transistors 22 and 32 in a pair of Schmit circuits in said first and second control circuits 20 and 30. Accordingly, the Schmit circuit is not reversed even if the phototransistor 34 is turned on immediately after the photocouplers 26 or 36 is once cut off by operation of the transistor 24 or 34, but can be reversed only providing a negative input to the base circuit (c) of the transistor 21 or 31. Further, since condensers 40 and 50 are inserted into base circuits of one of the transistors 21 and 31 of the Schmit circuits, the transistor 22 or 32 is always turned on and the Schmit circuits constitute a stable multicircuit always turned on in the predetermined direction when a power source is put in. Thus, the first and second exposure control means are controlled in a stable condition to effect said operations.

What is claimed is:

1. An automatic exposure control device adapted to be used in a camera comprising a first exposure control means for controlling the quantity of light passing through the exposure lens of the camera to give a correct exposure according to the brightness of an object to be photographed or televised, a second exposure control means including a plurality of filters of different transmitivity and means for selectively bringing one of said filters into the optical path of the exposure lens, and a filter selecting means for selecting one of said filters to bring the same into said optical path according to the level of brightness of the object.

2. An automatic exposure control device as defined in claim 1 wherein said filter selecting means comprises means for detecting the upper and lower limits of the control range of said first exposure control means, and means for changing said filters when said limit detecting means detects the limit of the first exposure control means, whereby the range of exposure control is substantially increased.

3. An automatic exposure control device as defined in claim 2 wherein said first exposure control means is a diaphragm the size of which is controlled by rotation of a diaphragm operating ring, said limit detecting means comprises a light source provided in the vicinity of said ring, a photoresponsive element provided to receive light emitted from said light source, and a light intercepting member provided on the periphery of the diaphragm operating ring to indicate the size of the diaphragm by the position thereof and intercept the light from the light source to prevent the photoresponsive element from receiving the light by coming into the position between the light source and the element, and said filter changing means comprises an electric circuit for energizing a driving motor to operate said second exposure control means to select one of said filters according to the output of said photoresponsive element.

4. An automatic exposure control means as defined in claim 3, wherein a photocoupler is used as said light source and said photoreceptor.

5. An automatic exposure control means as defined in claim 4, wherein said position regulating means comprises a light source disposed in the vicinity of the periphery of said filter turret, a photoreceptor for receiving the light from said light source, a light intercepting member provided on the periphery of the turret for intercepting the light from the light source to prevent the photoreceptor from receiving the light by coming into such a position to intercept the light as the turret rotates, and means for stopping the rotation of the turret upon interception of the light by detecting the output of said photoreceptor.

6. An automatic exposure control means as defined in claim 1 wherein said second exposure control means is a filter turret having a plurality of filters of different density arranged around the center of rotation of the turret.

7. An automatic exposure control means as defined in claim 6, wherein said filter turret is provided with a position regulating means for selectively stopping the turret at one of predetermined positions to bring one of said filters in alignment with the optical path of the exposure lens of the camera.

* * * * *